US009640150B2

(12) United States Patent
Koneru et al.

(10) Patent No.: US 9,640,150 B2
(45) Date of Patent: *May 2, 2017

(54) SELECTING DATA OF A SERVER SYSTEM FOR TRANSMISSION

(71) Applicant: ThinCI, Inc., El Dorado Hills, CA (US)

(72) Inventors: Satyaki Koneru, Folsom, CA (US); Ke Yin, El Dorado Hills, CA (US); Dinakar C. Munagala, El Dorado Hills, CA (US)

(73) Assignee: ThinCI, Inc., El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,000

(22) Filed: May 19, 2016

(65) Prior Publication Data
US 2016/0267889 A1 Sep. 15, 2016

Related U.S. Application Data

(63) Continuation of application No. 14/287,036, filed on May 25, 2014, now Pat. No. 9,373,152, which is a
(Continued)

(51) Int. Cl.
G09G 5/395 (2006.01)
G09G 5/36 (2006.01)
(Continued)

(52) U.S. Cl.
CPC ............ G09G 5/395 (2013.01); G06F 3/14 (2013.01); G06T 1/20 (2013.01); G06T 15/005 (2013.01);
(Continued)

(58) Field of Classification Search
None
See application file for complete search history.

(56) References Cited

U.S. PATENT DOCUMENTS 5,758,342 A * 5/1998 Gregerson ........ G06F 17/30067
707/695
6,195,391 B1 * 2/2001 Hancock ................ H04N 19/00
375/240

(Continued)

OTHER PUBLICATIONS

"Workload Characterization of 3D Games", Jordi Roca, Victor Moya, Carlos González, Chema Solís, Agustín Fernández, Department of Computer Architecture, Universitat Politècnica de Catalunya.
(Continued)

Primary Examiner — Maurice L McDowell, Jr.
Assistant Examiner — Donna J Ricks
(74) Attorney, Agent, or Firm — Brian R. Short

(57) ABSTRACT

Methods, systems and apparatuses for selecting graphics data of a server system for transmission are disclosed. One method includes reading data from memory of the server system, checking if the data is being read for the first time, checking if the data was written by a processor of the server system during processing, comprising checking if the data is available on a client system or present in a transmit buffer, placing the data in the transmit buffer if the data is being read for the first time and was not written by the processor during the processing as determined by the checking if the data was written by the processor of the server system during processing, wherein if the data is being read for the first time and was written by the processor of the server system during processing the data is not placed in the transmit buffer.

20 Claims, 18 Drawing Sheets

Related U.S. Application Data continuation-in-part of application No. 13/161,547, filed on Jun. 16, 2011, now Pat. No. 8,754,900.

(60) Provisional application No. 61/355,768, filed on Jun. 17, 2010.

(51) Int. Cl.

| | | |
|---|---|---|
| *G06T 15/00* | (2011.01) | |
| *H04N 21/426* | (2011.01) | |
| *H04N 21/434* | (2011.01) | |
| *H04N 21/81* | (2011.01) | |
| *G06T 1/20* | (2006.01) | |
| *H04N 19/42* | (2014.01) | |
| *G06F 3/14* | (2006.01) | |
| *H04N 21/236* | (2011.01) | |

(52) U.S. Cl.
CPC ....... *G09G 5/363* (2013.01); *H04N 21/23614* (2013.01); *H04N 21/42653* (2013.01); *H04N 21/4348* (2013.01); *H04N 21/8146* (2013.01); *G09G 2360/127* (2013.01); *G09G 2360/18* (2013.01); *G09G 2370/022* (2013.01); *G09G 2370/10* (2013.01); *H04N 19/42* (2014.11)

(56) References Cited

U.S. PATENT DOCUMENTS

| | | | | |
|---|---|---|---|---|
| 7,281,213 | B2* | 10/2007 | Callegari | G06T 15/005 345/582 |
| 8,441,494 | B2* | 5/2013 | Byford | G09G 5/001 345/539 |
| 8,754,900 | B2* | 6/2014 | Koneru | G06F 3/14 345/501 |
| 2003/0120747 | A1 | 6/2003 | Kim | |
| 2004/0091160 | A1* | 5/2004 | Hook | G06T 9/00 382/239 |
| 2005/0036546 | A1 | 2/2005 | Rey et al. | |
| 2005/0267779 | A1 | 12/2005 | Lee et al. | |
| 2009/0046937 | A1* | 2/2009 | Fenney | H04N 19/176 382/240 |
| 2009/0129643 | A1* | 5/2009 | Natanzon | G06F 19/321 382/128 |
| 2010/0250701 | A1* | 9/2010 | Harvell | G06F 15/16 709/217 |
| 2011/0037626 | A1 | 2/2011 | Fallon | |
| 2011/0047476 | A1* | 2/2011 | Hochmuth | G06F 3/1431 715/744 |
| 2011/0058604 | A1 | 3/2011 | Auberger et al. | |
| 2011/0074765 | A1 | 3/2011 | Oterhals et al. | |
| 2011/0110433 | A1 | 5/2011 | Bjontegaard | |
| 2011/0129162 | A1 | 6/2011 | Kim et al. | |
| 2011/0135009 | A1 | 6/2011 | Sugita | |
| 2011/0138064 | A1 | 6/2011 | Rieger et al. | |
| 2011/0138069 | A1 | 6/2011 | Momchilov | |
| 2011/0138076 | A1 | 6/2011 | Spicer et al. | |

OTHER PUBLICATIONS

Remote Rendering of Computer Games Peter Eisert, Philipp Fechteler Fraunhofer Institute for Telecommunications, Einsteinufer 37, D-10587 Berlin, Germany.

Dynamic 3D Graphics Workload Characterization and the Architectural Implications Tulika Mitra Tzi-cker Chiueh Computer Science Department State University of New York at Stony Brook.

Low Delay Streaming of Computer Graphics P. Eisert and P. Fechteler Fraunhofer Institute for Telecommunications Heinrich-Hertz Institute Einsteinufer 37, 10587 Berlin, Germany.

Games@Large Distributed Gaming System Arto Laikari1, Philipp Fechteler2, Peter Eisert3, Audrius Jurgelionis4, Francesco Bellotti5, Alessandro De Gloria6 1VTT Technical Research Centre of Finland, Espoo, Finland; 2,3Fraunhofer Institute.

Prefetching in a Texture Cache Architecture Homan Igehy Matthew Eldridge Kekoa Proudfoot Computer Science Department Department of Electrical Engineering Department of Electrical Engineering Stanford University.

PCT International Search Report, PCT/US2011/064992.

* cited by examiner

SELECTING DATA OF A SERVER SYSTEM FOR TRANSMISSION

RELATED APPLICATIONS

This patent application is a continuation of U.S. patent application Ser. No. 14/287,036, filed May 25, 2014, which is continuation-in-part (CIP) of U.S. patent application Ser. No. 13/161,547 filed on Jun. 16, 2011, which claims priority to U.S. provisional patent application Ser. No. 61/355,768 filed Jun. 17, 2010, which are all herein incorporated by reference.

FIELD OF THE EMBODIMENTS

The described embodiments relate generally to transmission of graphics data. More particularly, the described embodiments relate to methods, apparatuses and systems for selecting data of a server system for transmission.

BACKGROUND

The onset of cloud computing is causing a paradigm shift from distributed computing to centralized computing. Centralized computer includes most of the resources of a system being "centralized". These resources generally include a centralized server that includes central processing unit (CPU), memory, storage and support for networking. Applications run on the centralized server and the results are transferred to one or more clients.

Centralized computing works well in many applications, but falls short in the execution of graphics-rich applications, which are increasingly popular with consumers. Proprietary techniques are currently used for remote processing of graphics for thin-client applications. Proprietary techniques include Microsoft RDP (Remote Desktop Protocol), Personal Computer over Internet Protocol (PCoIP), VMware View and Citrix Independent Computing Architecture (ICA) and may apply a compression technique to a frame/display buffer.

Video compression scheme is most suited for remote processing of graphics for thin-client applications as the content of the frame buffer changes incrementally. Video compression scheme is an adaptive compression technique based on instantaneous network bandwidth availability, computationally intensive and places additional burden on the server resources. In video compression scheme, the image quality is compromised and additional latency is introduced due to the compression phase.

It is desirable to have a method, apparatus and system for transmission of graphics data that reduces computation demands, enables lossless compression and improves latency.

SUMMARY

One embodiment includes a method of selecting data of a server system for transmission. The method includes reading data from memory of the server system, checking if the data is being read for the first time, checking if the data was written by a processor of the server system during processing, comprising checking if the data is available on a client system or present in a transmit buffer, placing the data in the transmit buffer if the data is being read for the first time as determined by the checking if the data is being read for the first time, and was not written by the processor of the server system during the processing as determined by the checking if the data was written by a processor of the server system during processing, wherein if the data is being read for the first time and was written by the processor of the server system during processing the data is not placed in the transmit buffer, and transmitting the data of the transmit buffer to the client system.

Another embodiment includes a system for selecting data for transmission. The system includes a server system. The server system includes a processor and memory, wherein the memory comprises a frame buffer and a transmit buffer, the server system operable to read data from the memory, check if the data is being read for the first time, check if the data was written by the processor of the server system during processing, comprising checking if the data is available on a client system or present in the transmit buffer, place the data in the transmit buffer if the data is being read for the first time as determined by the checking if the data is being read for the first time, and was not written by the processor of the server system during the processing as determined by the checking if the data was written by a processor of the server system during the processing, wherein if the data is being read for the first time and was written by the processor of the server system during the processing the data is not placed in the transmit buffer.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses and systems for selecting graphics data for transmission. These embodiments provide for lossless or near-lossless transmission of graphics data between a server system and a client system while maintaining low latency. For the described embodiments, lossless and near-lossless may be used interchangeably and may mean lossless or near-lossless compression and transmission methods. For the described embodiments, processor refers to a device that processes graphics which includes and not limited to any one of or all of graphics processing unit (GPU), central processing unit (CPU), Accelerated Processing Unit (APU) and Digital Signal Processor (DSP). Depending upon a link bandwidth and/or capabilities of the client system, the described embodiments also include the transmission of video stream. For the described embodiments, graphics stream refers to uncompressed data which is a subset of graphics and command data. For the described embodiments, video stream refers to compressed frame buffer data.

Figure 1:
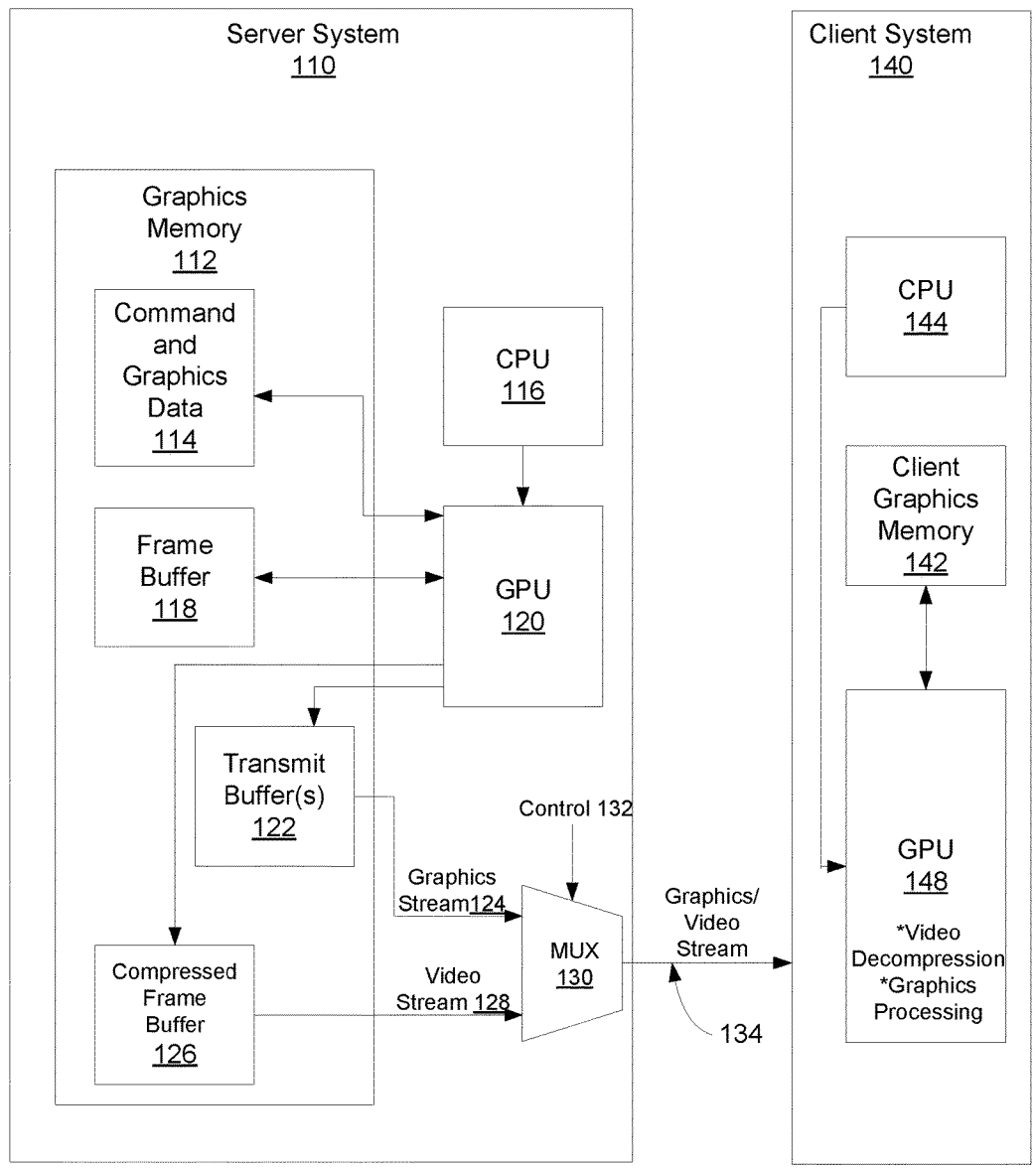
FIG. 1 shows a block diagram of an embodiment of a server and client systems.

FIG. 1 shows a block diagram of an embodiment of a graphics server-client co-processing system. The system consists of server system 110 and client system 140. This embodiment of server system 110 includes graphics memory 112, central processing unit (CPU) 116, graphics processing unit (GPU) 120, graphics stream 124, video stream 128, mux 130, control 132 and link 134. This embodiment of the client system 140 includes client graphics memory 142, CPU 144, and GPU 148.

Server System

As shown in FIG. 1, for the described embodiments, graphics memory 112 includes command and graphics data 114, frame buffer 118, transmit buffer(s) 122 (while shown as a single transmit buffer, for the embodiments that include multiple graphic render passes, the transmit buffer actually includes a transmit buffer for each of the graphic render passes), and compressed frame buffer 126. For the described embodiments, graphics memory 112 resides in server system 110. In another embodiment, graphics memory 112 may not reside in server system 110. The server system processes graphics data and manages data for transmission to the client system. Graphics memory 112 may be any one of or all of Dynamic Random Access memory (DRAM), Static Random Access Memory (SRAM), flash memory, content addressable memory or any other type of memory. For the described embodiments, graphics memory 112 is a DRAM storing graphics data. For the described embodiments, a block of data that is read or written to memory is referred to as a cache-line. For the described embodiments, the status of the cache-line of command and graphics data 114 is stored in graphics memory 112. In another embodiment, the status can be stored in a separate memory. In this embodiment, status-bits refer to a set of one or more status bits of memory used to store the status of a cache-line or a subset of the cache-line. A cache-line can have one or more sets of status-bits.

For the described embodiments, graphics memory 112 is located in the system memory (not shown in FIG. 1). In another embodiment, graphics memory 112 may be in a separate dedicated video memory. Graphics application running on the CPU loads graphics data into system memory. For the described embodiments, graphics data includes at least index buffers, vertex buffers and textures. The graphics driver of GPU 120 translates graphics Application Programming Interface (API) calls made by, for example, a graphics application into command data. For the described embodiments, graphics API refers to an industry standard API such as OpenGL or DirectX. For the described embodiments, the graphics and command data is placed in graphics memory either by copying or remapping. Typically, the graphics data is large and generally not practical to transmit to client systems as is.

GPU 120 processes command and data in command and graphics data 114 and selectively places data either in frame buffer 118 at the end of graphics rendering or in transmit buffer(s) 122 during graphics rendering. GPU 120 is a specialized processor for manipulating and displaying graphics. For the described embodiments, GPU 120 supports 2D, 3D graphics and/or video. As will be described, GPU 120 manages generation of compressed data for placement in the compressed frame buffer 126 and a subset of uncompressed graphics and command data is placed in transmit buffer(s) 122. The data from transmit buffer(s) contains graphics data and is referred to as graphics stream 124.

Transmit buffer(s) 122 is populated with a selected subset of command and graphics data 114 during graphics rendering. The selected subset of data from command and graphics data 114 is such that the results obtained by the client system by processing the subset of data can be identical or almost identical to processing the entire contents of command and graphics data 114. The process of selecting a subset of data from command and graphics data 114 to fill transmit buffer(s) 122 is discussed further in conjunction with FIG. 2. During the process of graphics rendering, GPU 120 fills transmit buffer(s) 122. For the described embodiments, the contents of transmit buffer(s) includes at least command data or graphics API command calls along with graphics data. For an embodiment, the allocated size of transmit buffer(s) 122 is adaptively determined by the maximum available bandwidth on the link. For example, the size of the frame buffer can dynamically change over time as the bandwidth of the link between the server system and the client system varies.

In this embodiment, GPU 120 is responsible for graphics rendering frame buffer 118 and generating compressed frame buffer 126. In this embodiment, compressed frame buffer 126 is generated if the client does not have capabilities or the bandwidth is not sufficient to transmit graphics stream. The compressed frame buffer is generated by encoding the contents of frame buffer 118 using industry standard compression techniques, for example MPEG2 and MPEG4.

Graphics stream 124 includes at least uncompressed graphics data and header with at least data type information. Graphics stream 124 is generated during graphics rendering and may be available while the transmit buffer(s) has data.

Video stream 128 includes at least a compressed video data and header conveying the information required for interpreting the data type for decompression. Video stream 128 can be available as and when compressed frame buffer 126 is generated.

Mux 130 illustrates a selection between graphics stream 124 generated by data from the transmit buffer(s) 122 and video stream 128 generated by data from compressed frame buffer 126. The selection by mux 130 is done on a frame-by-frame basis and is controlled by control 132, which at least in some embodiments is generated by the GPU 120. A frame is the interval of processing time for generating a frame-buffer for display. For other embodiments, control 132 is generated by CPU and/or GPU. For the described embodiments, control 132 dependents on at least in part upon either bandwidth of link 134 between the server system 110 and the client system 140, and the processing capabilities of client system 140.

Mux 130 selects between the graphics stream and the video stream, the selection can occur once per clock cycle, which is typically less than a frame. In this embodiment, the data transmitted on link 134 consists of data from compressed frame buffer and/or transmit buffer(s). For some embodiments, link 134 is a dedicated Wide Area Graphics Network (WAGN)/Local Area Graphics Network (LAGN) to transmit graphics/video stream from server system 110 to client system 140. In an embodiment, a hybrid Transmission Control Protocol (TCP)-User Datagram Protocol (UDP) may be implemented to provide an optimal combination of speed and reliability. For example, the TCP protocol is used to transmit the command/control packets and the UDP protocol is used to transfer the data packets. For example, command/control packet can be the previously described command data, the data packets can be the graphics data.

Client System

The client system receives data from the server system and manages the received data for user display. For the described embodiments, client system 140 includes at least client graphics memory 142, CPU 144, and GPU 148. Client graphics memory 142 which includes at least a frame buffer may be a Dynamic Random Access memory (DRAM), Static Random Access Memory (SRAM), flash memory, content addressable memory or any other type of memory. In this embodiment, client graphics memory 142 is a DRAM storing command and graphics data.

In an embodiment, graphics/video stream received from server system 110 via link 134 is a frame of data and processed using standard graphics rendering or video processing techniques to generate the frame buffer for display. The received frame includes at least a header and data. For the described embodiments, the GPU reads the header to detect the data type which can include at least uncompressed graphics stream or compressed video stream to process the data. The method of handling the received data is discussed in conjunction with FIG. 5.

Figure 2:
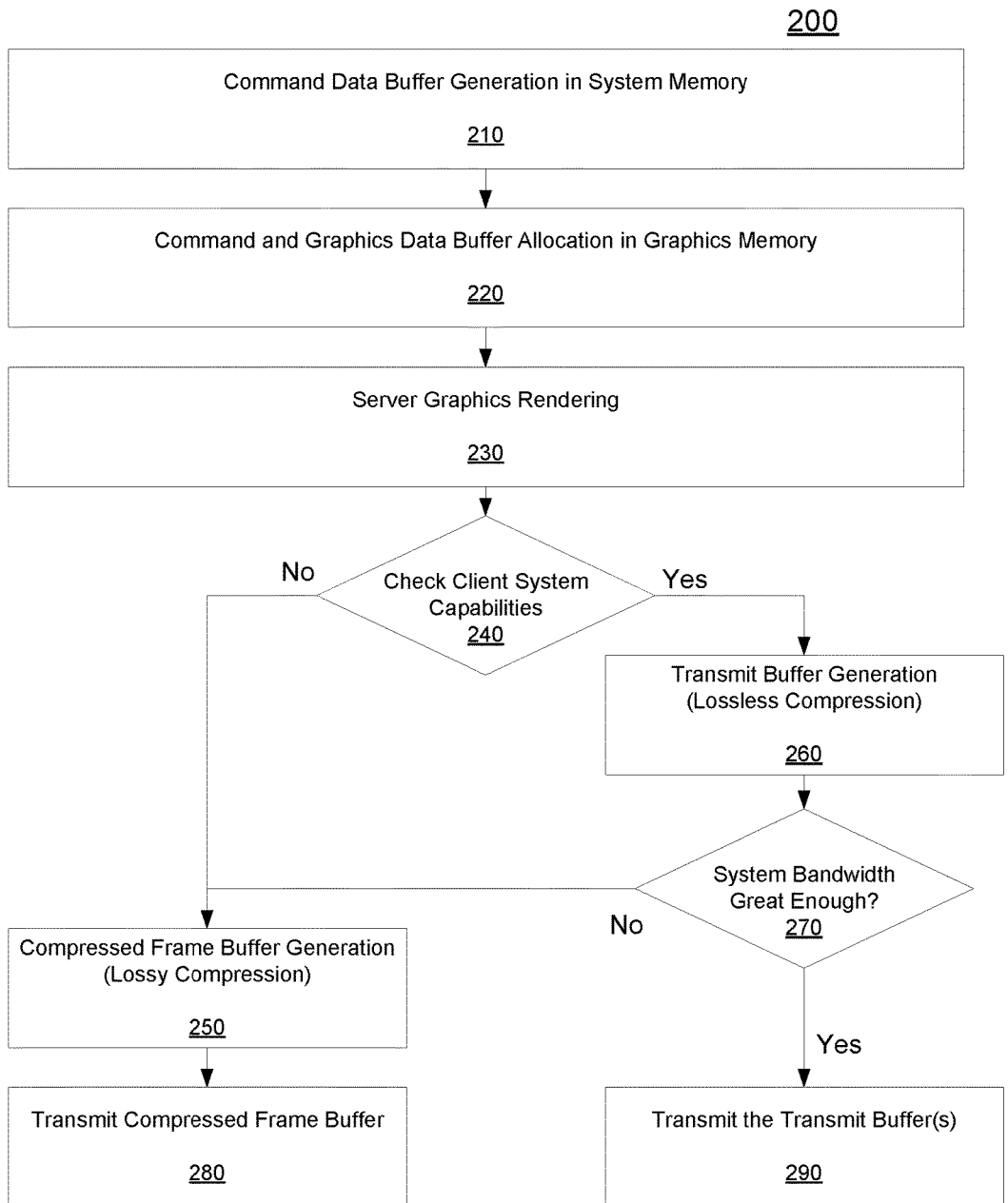
FIG. 2 is a flow chart that includes the steps of an example of a method selecting graphics data for transmission from the server to the client.

FIG. 2 is a flow chart of method 200 that includes the steps of an example of a method of selecting graphics data for transmission from the server to the client. In step 210, command data buffer generation takes place. In this step, the graphics software application commands are compiled by the GPU software driver to translate command data in system memory. This step also involves the process of loading the system memory with graphics data.

In step 220 command and graphics data buffer is allocated. In this step, a portion of free or unused graphics memory 112 is defined as command and graphics data 114 based on the requirement and the command and graphics data in system memory is copied to graphics memory 112 if the graphics memory is a dedicated video memory or remapped/copied to graphics memory 112 if the graphics memory is part of system memory.

In step 230, graphics data is rendered on server system 110. Graphics data in server system 110 read from command and graphics data 114 is rendered by GPU 120. For the described embodiments, graphics rendering or 3D rendering is the process of producing a two-dimensional image based on three-dimensional scene data. Graphics rendering involves processing of polygons and generating the contents of frame buffer 118 for display. Polygons such as triangles, lines & points have attributes associated with the vertices which are stored in vertex buffer/s and determine how the polygons are processed. The position coordinates undergo linear (scaling, rotation, translation etc.) and viewing (world and view space) transformation. The polygons are rasterized to determine the pixels enclosed within. Texturing is a technique to apply/paste texture images onto these pixels. The pixel color values are written to frame buffer 118.

Step 240 involves checking the client system capabilities to decide the compression technique. In the described embodiments, the size and bandwidth of client graphics memory 142, graphics API support in the client system, the performance of GPU 148 and decompression capabilities of client system 140 constitutes client system capabilities.

When the client system has capabilities, transmit buffer(s) is generated. In step 260, the contents of transmit buffer(s) 122 is generated during graphics rendering. Data is written into transmit buffer(s) 122 as and when data is rendered. A subset of graphics and command data is identified and unique instances of data are selected for placing data in transmit buffer(s) 122 which is discussed in conjunction with FIG. 3. The data from transmit buffer(s) is referred to as graphics stream 124.

In step 270, method 200 checks for at least the bandwidth of link 134 connecting server system 110 and client system 140. If sufficient bandwidth is available, graphics stream 124 is transmitted in step 290.

If the bandwidth available is not sufficient or if the client system does not have capabilities, compressed frame buffer 126 is generated. In step 250, compressed frame buffer is generated by encoding the contents of frame buffer 118 using MPEG2, MPEG4 or any other compression techniques. The selection of compression technique is determined by the client capabilities. After graphics rendering is complete, the compressed frame buffer is filled during compression of frame buffer 118. In step 280, compressed frame buffer is transmitted.

Figure 3:
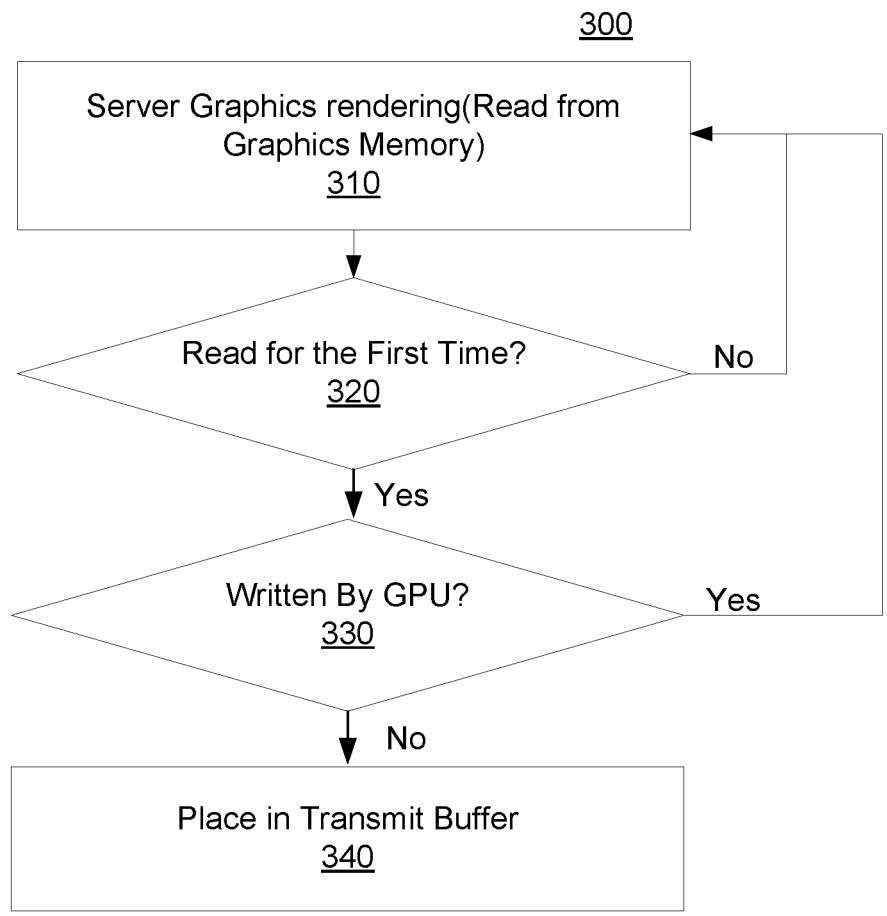
FIG. 3 is a flow chart that includes the steps of an example of a method placing data in a transmit buffer.

FIG. 3 is a flow chart of method 300 that includes the steps of an example of a method placing data in a transmit buffer(s) 122. In step 310, a cache-line or a block of data is read from command and graphics data 114 or frame buffer 118 graphics rendering by the server system. The steps of FIG. 3 are repeated for each graphics render pass.

In step 320, the cache-line is checked for being read for the first time to determine if the data in the cache-line is new. If the data has been read earlier, the data is available on client system 140 or present in transmit buffer(s) 122; the cache-line is not processed further and method 300 returns to step 310. If the cache-line is being read for the first time, the client system does not have the data and not present in the transmit buffer(s) 122, method 300 proceeds to step 330.

In step 330, the cache-line of command and graphics data 114 or frame buffer 118 is checked if the data in the cache-line was written during graphics rendering by a processor. If the data in the cache-line was written by a processor, the data in cache-line is not processed and method 300 returns to step 310. If the cache-line is not written by the processor, then method 300 proceeds to step 340. In step 340, the cache-line is placed in transmit buffer(s) 122.

Note that for at least some embodiments, steps 320 and 330 are performed for each of the described graphic render passes.

Figure 4:
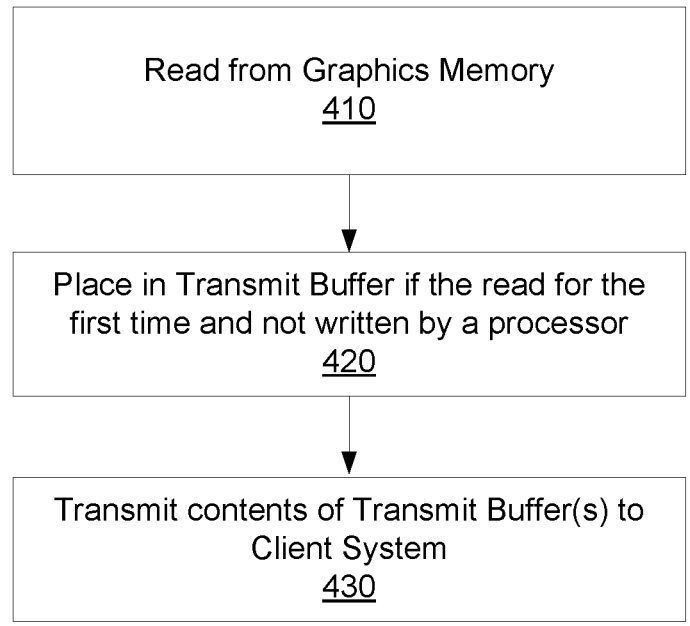
FIG. 4 is a flow chart that includes steps of an example of a method of selecting graphics data of a server system for transmission.

FIG. 4 is a flow chart that includes steps of an example of a method of selecting graphics data of a server system for transmission. A first step 410 includes reading data from graphics memory of the server system. A second step 420 includes placing the data in a transmit buffer(s) if the data is being read for the first time, and was not written during graphics rendering by a processor of the server system. A third step 430 includes transmitting the data of the transmit buffer(s) to a client system. In an embodiment, the processor is a CPU and/or a GPU. For an embodiment, steps 410 and 420 are repeated for each graphics render pass.

In this embodiment, the server system includes a central processing unit (CPU) and a graphics processing unit (GPU). The GPU controls compression and placement of data of a frame buffer into a compressed frame buffer. The GPU controls selection of either compressed data of the compressed frame buffer or uncompressed data of the transmit buffer(s) for transmission to the client system.

Checking a first status-bit determines whether the data is being read for the first time. The first status-bit is set when the data is placed in the transmit buffer(s) and not yet transmitted.

The data being read can be a cache-line which is a block of data. One or more status-bits define the status of the cache-line. In another embodiment, each sub-block of the cache-line can have one or more status-bits. For an embodiment, the data comprises a plurality of blocks, and wherein determining if the data is being read for the first time comprises checking at least one status-bit corresponding to at least one block The second status-bit determines whether the data was not written by the processor. The second status-bit is set when the processor writes to the graphics memory. The first status-bit is reset upon detecting a direct memory access (DMA) of the graphics memory or reallocation of the graphics memory. The second status-bit is reset upon detecting a direct memory access (DMA) of the graphics memory or reallocation of the graphics memory. For the described embodiments, DMA refers to the process of copying data from the system memory to graphics memory.

The method of selecting graphics data of a server system for transmission, further comprises compressing data of a frame buffer of the graphics memory.

The method of selecting graphics data of a server system for transmission, further comprises checking at least one of a bandwidth of a link between the server system and a client system, and capabilities of the client system, and the server system transmitting at least one of the compressed frame buffer data or the transmit buffer(s) based at least in part on the at least one of the bandwidth of the links and the capabilities of the client system.

The bandwidth and the client capabilities are checked on a frame-by-frame basis to determine whether to compress data of the frame buffer on a frame-by-frame basis, and place a percentage of the data in the transmit buffer(s) for every frame. For an embodiment, checking on a frame-by-frame basis includes checking the client capabilities and the bandwidth at the start of each frame, and placing the compresses or uncompressed data in the frame buffer or transmit buffer(s) accordingly for the frame.

If adequate bandwidth is available and the client is capable of processing graphics stream 124, the transmit buffer(s) is transmitted to the client system. If the bandwidth and the client capabilities determine that graphics stream 124 cannot be transmitted, then compressed frame buffer data and optionally partial uncompressed transmit buffer data is transmitted to the client system. If the client system does not have the capabilities to handle uncompressed data, then compressed frame buffer data is transmitted to the client system. If the transmit buffer(s) is capable of being transmitted to the client system, the compression phase is dropped and no compressed video stream is generated.

The server system maintains reference frame/s for subsequent compression of data of the frame buffer. For each frame, a decision is made to send either lossless graphics data or lossy video compression data. When implementing video compression for a particular frame on the server, previous frames are used as reference frames. The reference frames correspond to lossless frame or lossy frame transmitted to the client.

Figure 5:
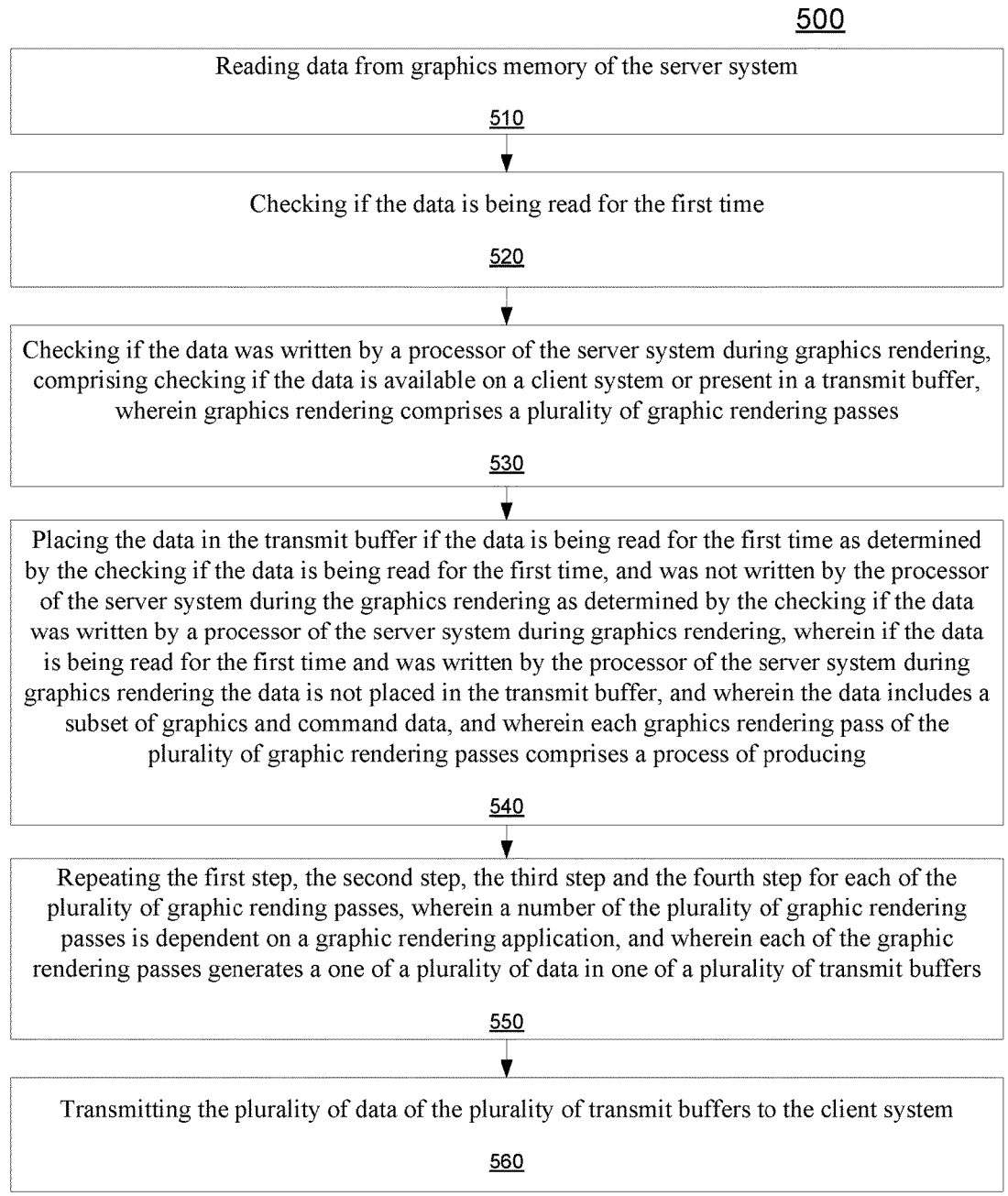
FIG. 5 is a flow chart that includes steps of a method of selecting graphics data of a server system for transmission that includes multiple graphics render passes.

FIG. 5 is a flow chart 510 that includes steps of a method of selecting graphics data of a server system for transmission that includes multiple graphics render passes. A first step 510 includes reading data from graphics memory of the server system. A second step 520 includes checking if the data is being read for the first time. A third step 530 includes checking if the data was written by a processor of the server system during graphics rendering, comprising checking if the data is available on a client system or present in a transmit buffer, wherein graphics rendering comprises a plurality of graphic render passes. A fourth step 540 includes placing the data in the transmit buffer if the data is being read for the first time as determined by the checking if the data is being read for the first time, and was not written by the processor of the server system during the graphics rendering as determined by the checking if the data was written by a processor of the server system during graphics rendering, wherein if the data is being read for the first time and was written by the processor of the server system during graphics rendering the data is not placed in the transmit buffer, and wherein the data includes a subset of graphics and command data, and wherein each graphics render pass of the plurality of graphic render passes comprises a process of producing a set of images. A fifth step 550 includes repeating the first step, the second step, the third step and the fourth step for each of the plurality of graphic rending passes, wherein a number of the plurality of graphic render passes is dependent on a graphic rendering application, and wherein each of the graphic render passes generates a one of a plurality of data in one of a plurality of transmit buffers. A sixth step 560 includes transmitting the plurality of data of the plurality of transmit buffers to the client system.

For at least some of the described embodiment graphics rendering consists of a series of steps (passes) connected in a hierarchical tree topology with each step (pass) generating outputs which are provided as inputs to downstream steps (passes). Each of these steps is defined as a graphic render pass.

For at least some embodiments, a set images of at least one of the graphic render passes is used as graphic data of a subsequent graphic render pass. For at least some embodiments, a final graphic render pass generates a final set of images.

At least some embodiments further include determining a size of each transmit buffer of each of multiple graphic render passes, summing a plurality of combinations of sizes of combinations of the plurality of transmit buffers, and selecting a combination of the plurality of combinations that provides within a margin a minimal summed size. For an embodiment, the margin is zero, and the selected combination provides the minimum summed size. For an embodiment, the margin is greater than zero. An embodiment includes the server system transmitting the transmit buffers of the selected combination of transmit buffers.

For at least some embodiments, the processor includes at least one of a central processing unit (CPU) and a graphics processing unit (GPU), the method further comprising the GPU controlling compression and placement of data of a frame buffer into a compressed frame buffer, and the GPU controlling a selection of either compressed graphics data of the compressed frame buffer or the plurality of data of the plurality of transmit buffers for transmission to the client system.

At least some embodiments further include compressing data of a frame buffer of the graphics memory. At least some embodiments further include checking at least one of a bandwidth of a link between the server system and the client system, and capabilities of the client system, and the server system transmitting at least one of the compressed frame buffer data or the data of the transmit buffer based at least in part on the at least one of the bandwidth of the links and the capabilities of the client system. For at least some embodiments checking the bandwidth and the capabilities is performed on a frame-by-frame basis.

At least some embodiments further include the server system providing a reference frame to the client system for allowing the client system to decompress compressed video received from the server system and maintaining the reference frame for subsequent compression of data of the frame buffer even when the reference frame is lossless.

Figure 6:
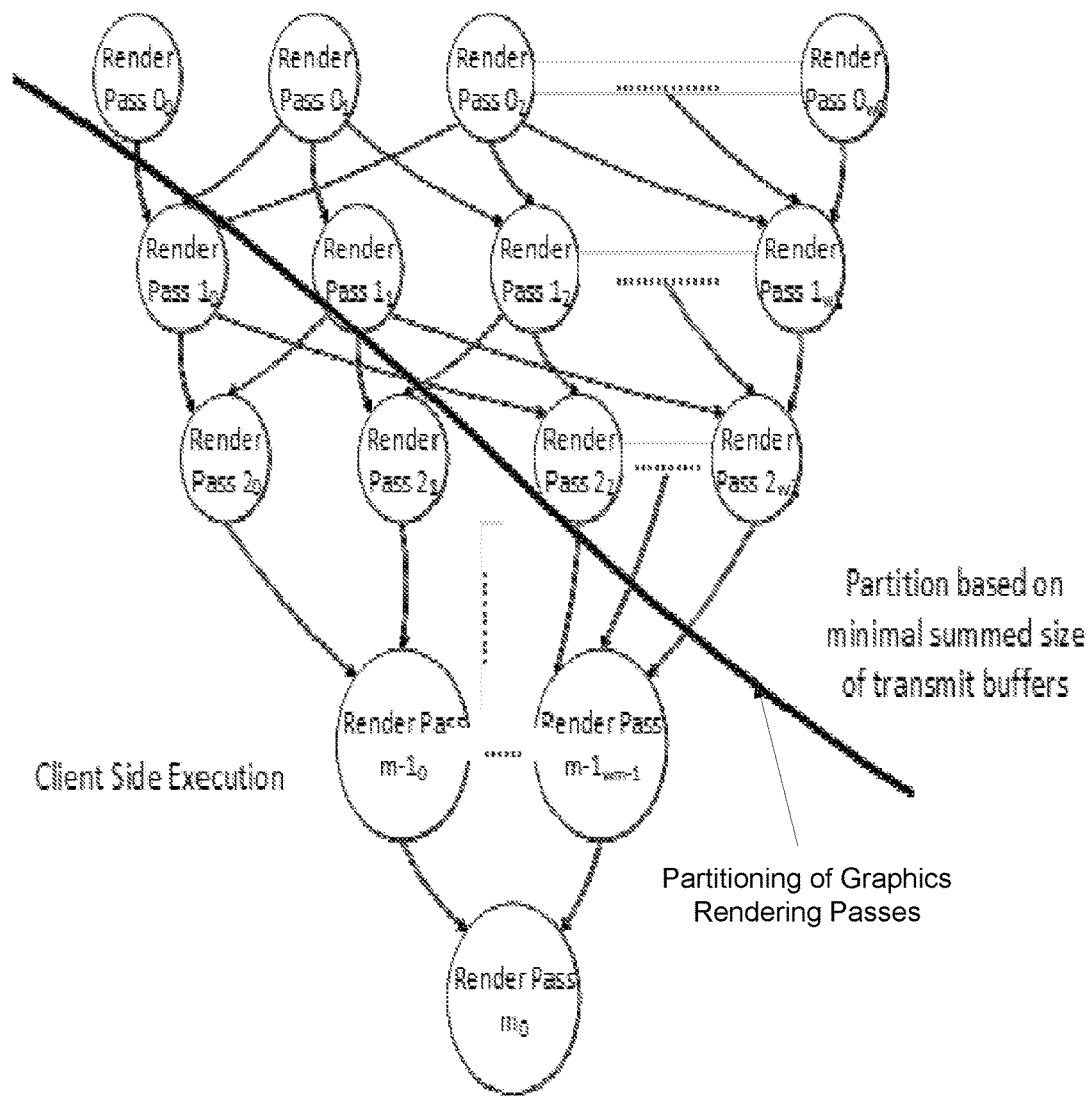
FIG. 6 shows multiple graphic render passes, and combinations of sums of data of graphic render passes, according to an embodiment.

FIG. 6 shows multiple graphic render passes, and combinations of sums of data of graphic render passes, according to an embodiment. As previously described, for at least some embodiments, the graphic rendering processing is performed with a series of graphic render-passes with each pass provided with input graphics data and command data buffers. Each graphics render pass generates output graphics data. All the passes are connected in a tree structure (tree-graph) as shown in FIG. 6 with the final pass generating the frame buffer that is displayed. This embodiment includes connectivity between the output and input graphics data buffers. For an embodiment, the command data buffers are generated by software into each graphics render pass.

As part of the network graphics mechanism, each of these render passes goes through the identification of the data to be placed in the transmit buffer. After the completion of rendering of all the render passes, the partitioning of the tree-graph is determined based on the minimal bandwidth needed between server and client. The minimal bandwidth determination is made based at least one of several conditions. For every combination of render-pass execution on the client side, the sizes of the transmit buffers feeding into those render-passes are added up. The combination providing the minimum summed size corresponds to the minimum bandwidth between server and client. As previously stated, the minimum may not actually be selected. That is, a sub-minimum combination, or a combination within a margin of the minimum combination may be selected.

The transmit buffers for this combination are transferred from server to client.

Figure 7:
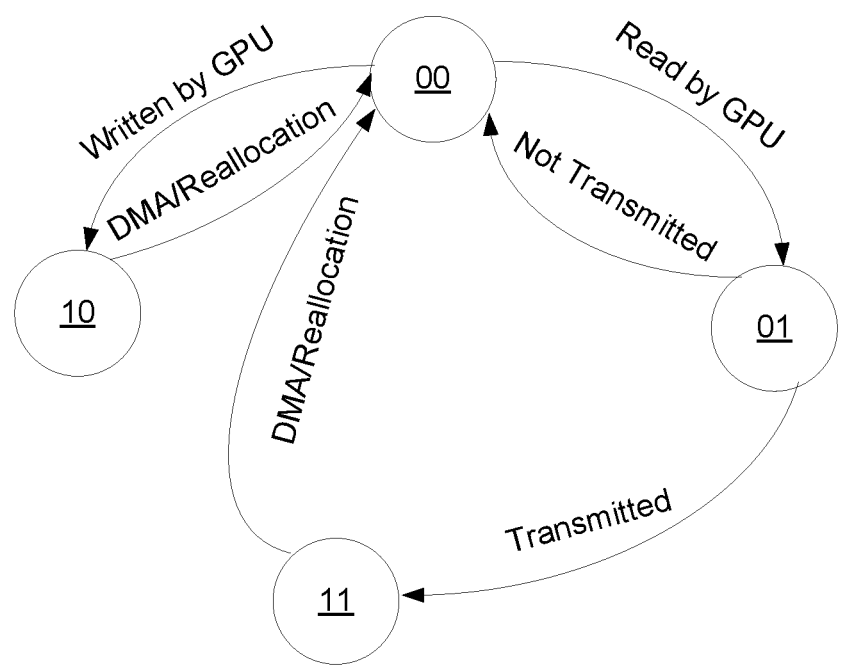
FIG. 7 shows an example of setting and resetting of status-bits that are used for determining whether to place data in the transmit buffer.

FIG. 7 shows an example of setting and resetting of status-bits that are used for determining whether to place data in the transmit buffer(s). For the described embodiment, at least two status-bits are required to determine if a cache-line can be placed in transmit buffer(s) for transmission to the client system. '00', '01', '11' and '10' indicate the state of the status-bits or the value of the status-bits.

From '00' State: When a cache-line of server graphics data is read or written by the processors for the first time from command and graphics data 114 and/or frame buffer 118 (step 310) the status-bits of each cache-line has a value '00' also referred to as state '00'. The cache-line can be either read by the processors or written by the processor to change state. When the processor reads the cache-line, the status-bits are updated to '01' state. If the cache-line is written by the processor, the status-bits of the cache-line are updated to '10' state.

From '01' State: The status-bits of the cache-line read by the processor is updated to state '11' when the cache-line is transmitted to client system 140. The status-bits are reset to '00' state if the cache-line was not transmitted due to bandwidth limitations.

From '11' State: The status-bits can have the value '11' when the cache-line is transmitted to client system 140 via transmit buffer(s) 122. The status-bits are reset when the cache-line is cleared due to memory reallocation or Direct Memory Access (DMA) operation.

From '10' State: Once a cache-line is written by processor 120, the cache-line cannot be transmitted via transmit buffer(s) and assumes a '10' state. The status-bits of the cache-line are reset due to memory reallocation or Direct Memory Access (DMA) operation.

Figure 8:
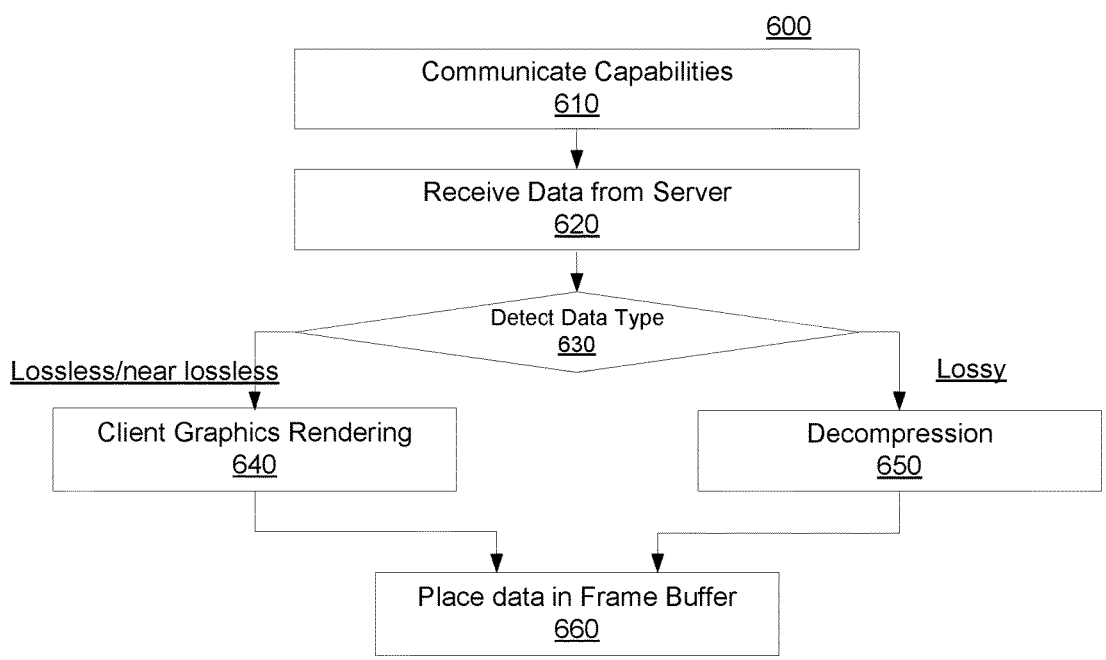
FIG. 8 is a flow chart that includes steps of a method of operating a client system.

FIG. 8 is a flow chart of method 600 that includes steps of a method of operating a client system. In step 610, client system 140 in one or more handshaking operations, establish the connection with server system 110 and communicate the capabilities of client system 140. In step 620, client system 140 receives a frame of data from server system 110. In this embodiment, the data received includes a header with information about the type of data and the type of compression technique followed by data. The received data includes one or more header and data combinations so that the header and data maybe interleaved.

In step 630, method 600 reads the data header to detect the data type. If method 600 detects uncompressed data, method 600 proceeds to step 640. If method 600 detects compressed data, method 600 proceeds to step 650. Graphics rendering of received data takes place in step 640. In step 650, method 600 decompresses the received data. In step 660, data is placed in the frame buffer of client graphics memory 142 for display.

Extensions and Alternatives

Network Graphics

Figure 9:
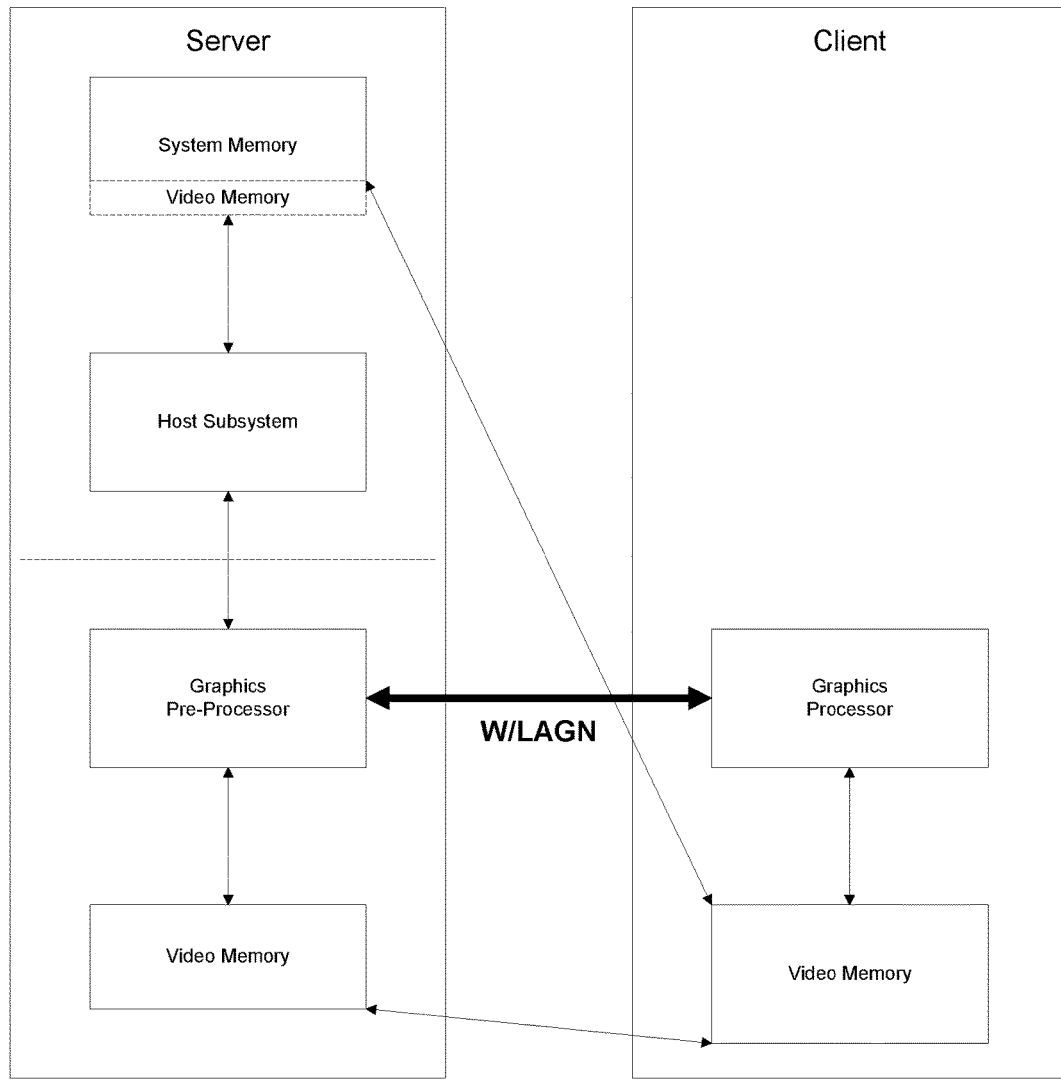
FIG. 9 shows a block diagram of an embodiment of a server system and a client system.6

FIG. 9 shows a block diagram of an embodiment of a server system and a client system. With the onset of cloud computing, the paradigm is shifting from distributed computing to centralized computing. All the resources in the system are being centralized. These include the CPU, storage, networking etc. Applications are run on the centralized server and the results are ported over to the client. This model works well in a number of scenarios but fails to address execution of graphics-rich applications which are becoming increasingly important in the consumer space. Centralizing graphics computes has not been addressed adequately as yet. This is because of issues with virtualization of the GPU and bandwidth constraints for transfer of the GPU output buffers to the client.

Different proprietary techniques are currently used for remoting of graphics for thin-client applications. These include Microsoft RDP (Remote Desktop Protocol), PCoIP, VMware View and Citrix ICA. All of them rely on some kind of compression technique applied to the frame/display buffer. Given the property that the frame buffer content changes incrementally, a video compression scheme is most suited. Video compression is a technique which lends itself to adaptive compression based on instantaneous network bandwidth availability. Video compression technique does have a few limitations. These include:

Computationally intensive and places a heavy additional burden on the server resources.

To achieve adequate compression, the image quality is compromised.

Network latency is an issue in remote graphics. Additional latency introduced because of the compression phase.

The evolution of the graphics API has also created a relatively low, albeit variable, bandwidth interface at the API level. There are different resources/surfaces (indices, vertices, constant buffers, shader programs, textures) needed by the GPU for processing. In $3d$ graphics processing, these resources get reused for multiple frames and enable cross-frame caching. Vertex and texture data are the biggest consumers of the available video memory foot-print but only a small percentage of the data is actually used and the utilization is spread across multiple frames.

The above-described property of the 3D API is exploited to develop the scheme of API remoting. A server-client co-processing model has been developed to significantly trim the bandwidth requirements and enable API remoting. The server operates as a stand-alone system with all the desktop graphics applications being run on the server. During the execution, key information is gathered which identifies the minimal set of data needed for execution of the same on the client side. The data is then transferred over the network. The API interface bandwidth being variable, one cannot guarantee adequate bandwidth availability. Hence an adaptive technique is adopted whereby when the API remoting bandwidth needs exceed the available bandwidth, the display frame (which was anyhow created on the server side to generate the statistics for minimal data-transfer) is video-encoded and sent over the network. The decision is made at frame granularity.

Data in memory is stored in the form of cache-lines. A bit-map is maintained on the server side which tracks the status of each cache-line. The bit-map indicates 0—the cache-line is clean (never written to or never accessed so far since the last DMA write)

1—has been transferred to the client.

When a particular cache-line is accessed and its status is '0', the accessed data is placed in a network ring and the status is updated to '1'. If the network ring overflows i.e. the required bandwidth for API remoting exceeds the available network bandwidth, execution continues but does not update the bitmap/network ring. The data in the network ring is trickled down to the client. After the creation of the final display buffer, it is adaptively video-encoded for transmission. Over time, the bandwidth requirements for API remoting will gradually reduce and will eventually enable it.

A dedicated Wide/Local Area Graphics Network (WAGN/LAGN) is implemented to carry the graphics network data from the server to the client. A hybrid TCP-UDP protocol is implemented to provide an optimal combination of speed and reliability. The TCP protocol is used to transmit the command/control packets (command buffers/shader programs) and the UDP protocol is used to transfer the data packets (index buffers/vertex buffers/textures/constant buffers).

To avoid the need for a graphics pre-processor on the server, software running on the server side can generate the traffic to be sent to the client for processing. The driver stack running on the server would identify the surfaces/resources/state required for processing the workload and push the associated data to the client over the system network. Conceptually, the above-mentioned bandwidth reduction scheme (running the workload on the server using a software rasterizer and identifying the minimal data for processing on the client side) can also be implemented and the short-listed data can be transferred to the client.

Graphics Virtualization-Hardware Assist

Virtualization is a technique for hiding the physical characteristics of computing resources to simplify the way in which other systems, applications, or end users interact with those resources. The proposal lists different features which are implemented in the hardware to assist virtualization of the graphics resource. These include:

Memory Virtualization

Figure 10:
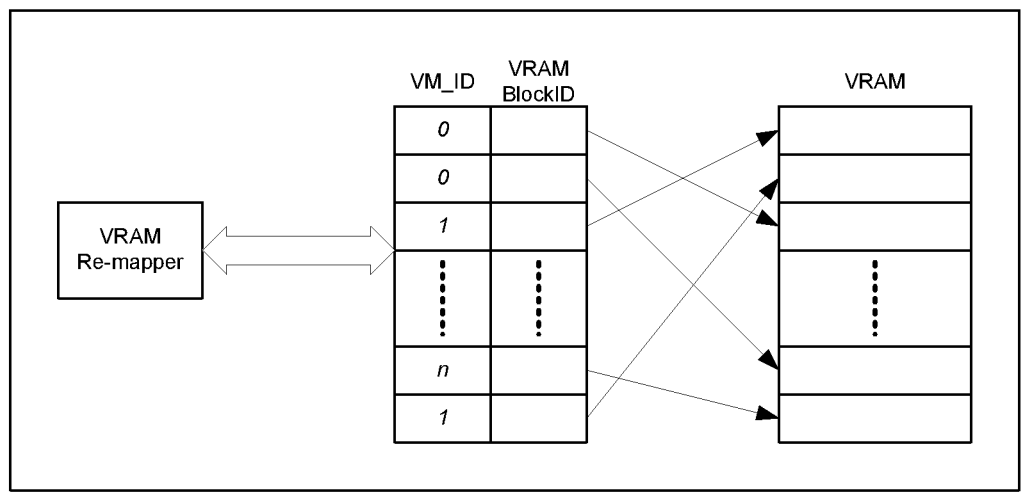
FIG. 10 shows a block diagram of a hardware assisted memory virtualization in a graphics system.

FIG. 10 shows a block diagram of hardware assisted memory virtualization in a graphics system. Video memory is split between the virtual machines (VMs). The amount of memory allocated to each VM is updated regularly based on utilization and availability. But it is ensured that there is no overlap of memory between the VMs so that video memory management can be carried out by the VMs. Hardware keeps track of the allocation for each VM in terms of memory blocks of 32 MB. Thus the remapping of the addresses used by the VMs to the actual video memory addresses is carried out by hardware.

Hardware Virtualization

Figure 11:
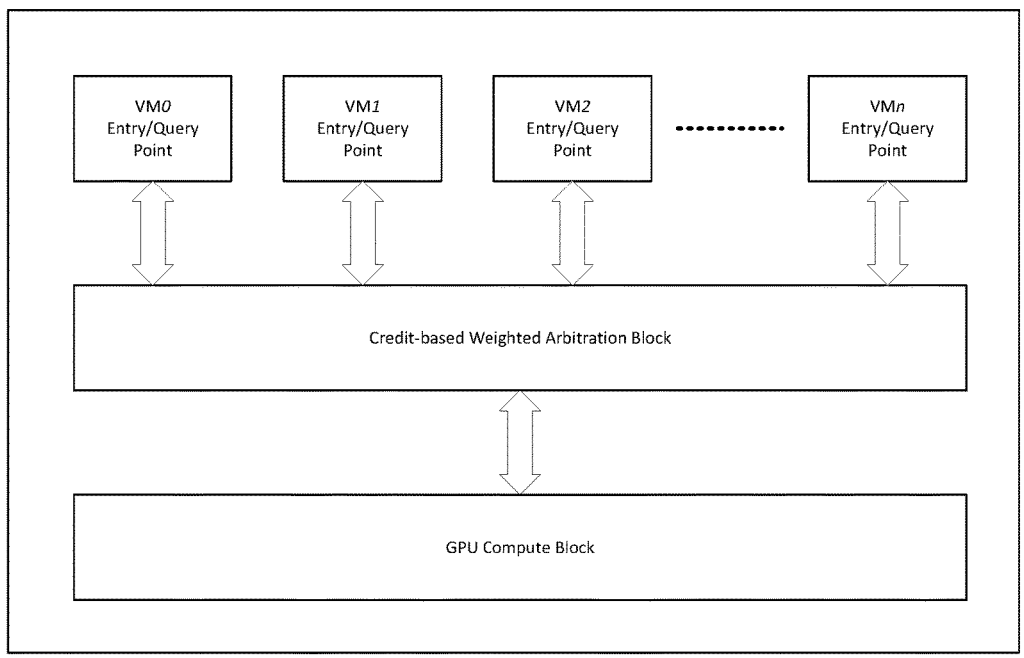
FIG. 11 shows a block diagram of hardware virtualization in a graphics system.

FIG. 11 shows a block diagram of hardware virtualization in a graphics system. To provide a view of dedicated hardware to the VMs, each VM is provided an entry point into the hardware. The VMs deliver workloads to the hardware in a time-sliced fashion. The hardware builds in mechanisms to fairly arbitrate and manage the execution of these workloads from each of the VMs.

Fast Context-Switching

Figure 12:
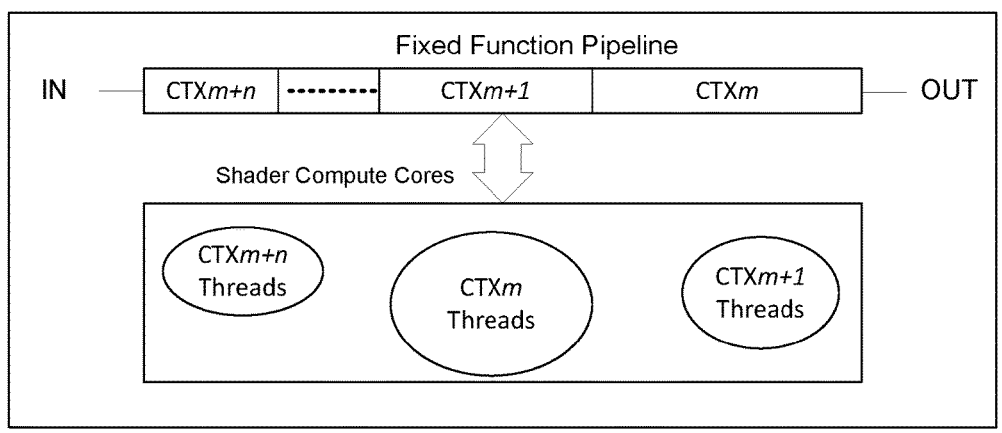
FIG. 12 shows a block diagram of fast context switching in a graphics system.

FIG. 12 shows a block diagram of fast context switching in a graphics system. With hardware virtualization, the number of context switches (changing workloads) would be more frequent. To get effective hardware virtualization, fast context-switching is required to get minimal overhead when switching between the VMs. The hardware implements thread-level context switching for fast response and also concurrent context save and restore to hide the switch latency.

Scalar/Vector Adaptive Execution

Figure 13:
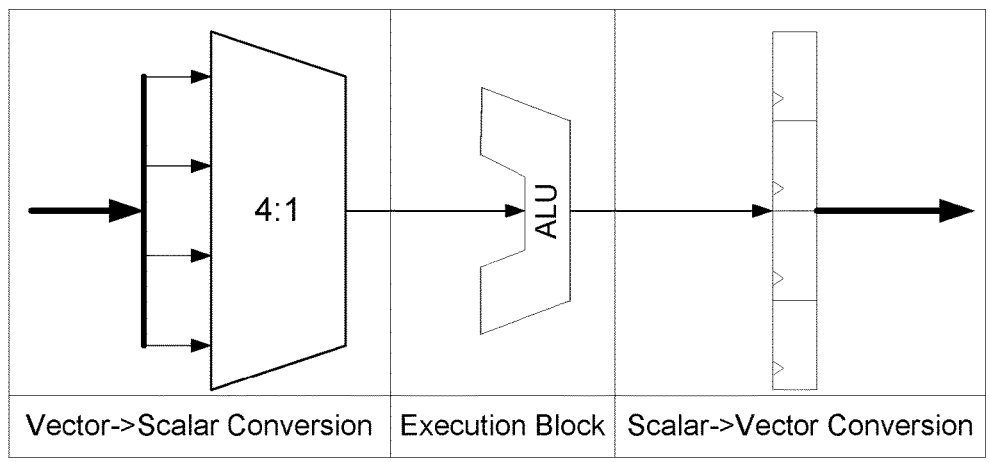
FIG. 13 shows a block diagram of scalar/vector adaptive execution in a graphics system.

FIG. 13 shows a block diagram of scalar/vector adaptive execution in a graphics system.

Processors have an instruction-set defined to which the device is programmed. Different instruction-sets have been developed over the years. The baseline scalar instruction-set for OpenCL/DirectCompute defines instructions which operate on one data entity. A vector instruction-set defines instructions which operate on multiple data i.e. they are SIMD. 3D graphics APIs (openGl/DirectX) define a vector instruction set which operate on 4-channel operands.

The scheme we have here defines a technique whereby the processor core carries out adaptive execution of scalar/4-D vector instruction sets with equal efficiency. The data operands read from the on-chip registers or buffers in memory are 4× the width of the ALU compute block. The data is serialized into the compute block over 4 clocks. For vector instructions, the 4 sets of data correspond to one register for the execution thread. For scalar instructions, the 4 sets of data correspond to one register for four execution threads. At the output of the ALU, the 4 sets of result data are gathered and written back to the on-chip registers.

Smart Pre-Fetch/Pre-Decode Technique

Figure 14:
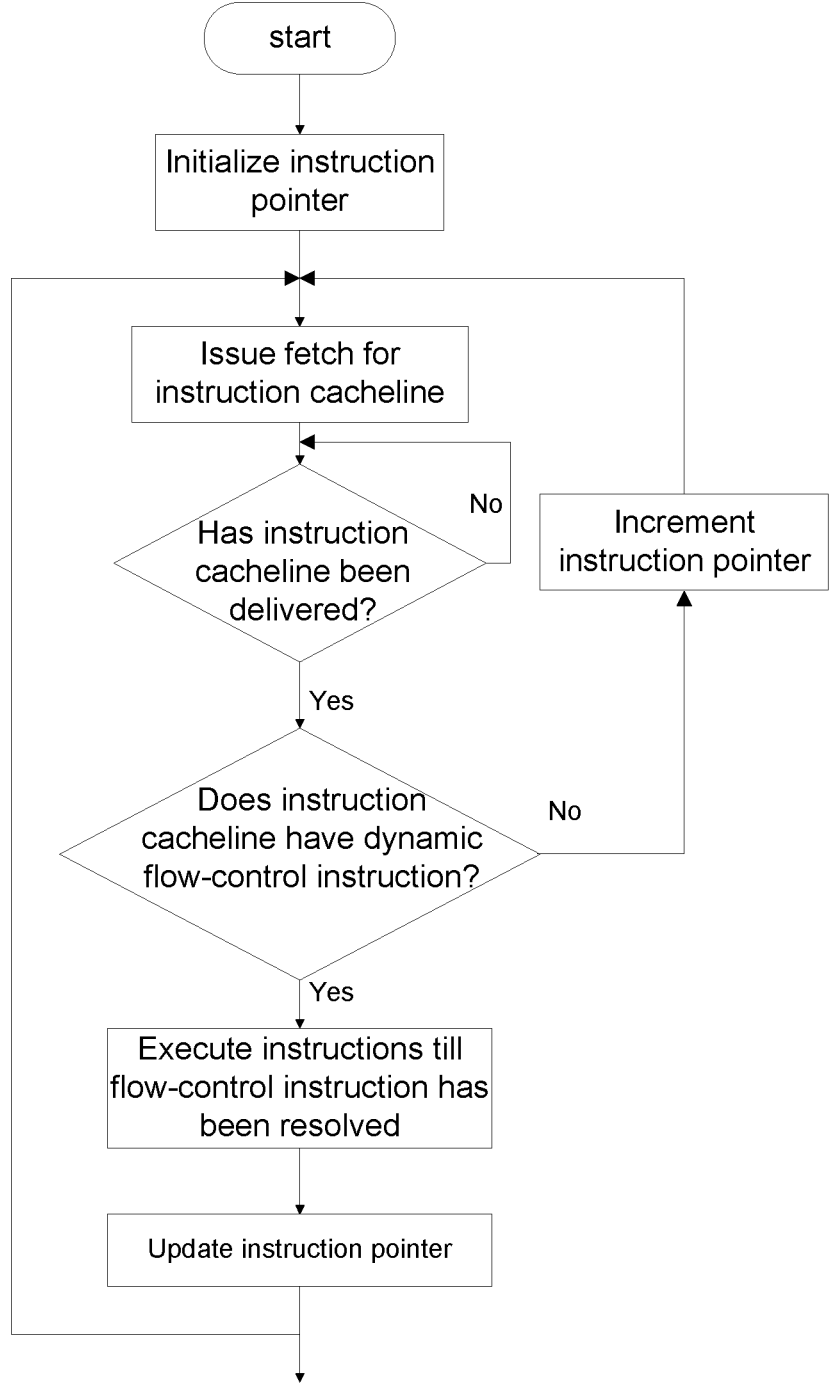
FIG. 14 shows a flowchart of a smart pre-fetch/pre-decode technique in a graphics system.

FIG. 14 shows a flowchart of a smart pre-fetch/pre-decode technique in a graphics system.

The processors of today have multiple pipeline stages in the compute core. Keeping the pipeline fed is a challenge for designers. Fetch latencies (from memory) and branching are hugely detrimental to performance. To address these problems, a lot of complexity is added to maintain a high efficiency in the compute pipeline. Techniques include speculative prefetching and branch prediction. These solutions are required in single-threaded scenarios. Multi-threaded processors lend themselves to a unique execution model to mitigate these same set of problems.

While executing a program for a thread on the multi-threaded processor, only one instruction cache-line (made up of multiple instructions time. The clocks required to process the instructions in the instruction cache-line match the instruction fetch latency. This ensures that in non-branch scenarios, the instruction fetch latency is hidden. On reception of the instruction cache-line from memory, it is pre-decoded. If an unconditional branch instruction is) is fetched at a present, the fetch for the next instruction cache-line is issued from the branch instruction pointer. If a conditional branch instruction is present, the fetch of the next instruction cache-line is deferred until the branch is resolved. Because of the presence of multiple threads, this mechanism does not result in reduction of efficiency.

While pre-decoding the instruction cache-line, another piece of information extracted is about all the data operands required from memory. A memory fetch for all these data operands is issued at this point.

Video Processing

Figure 15:
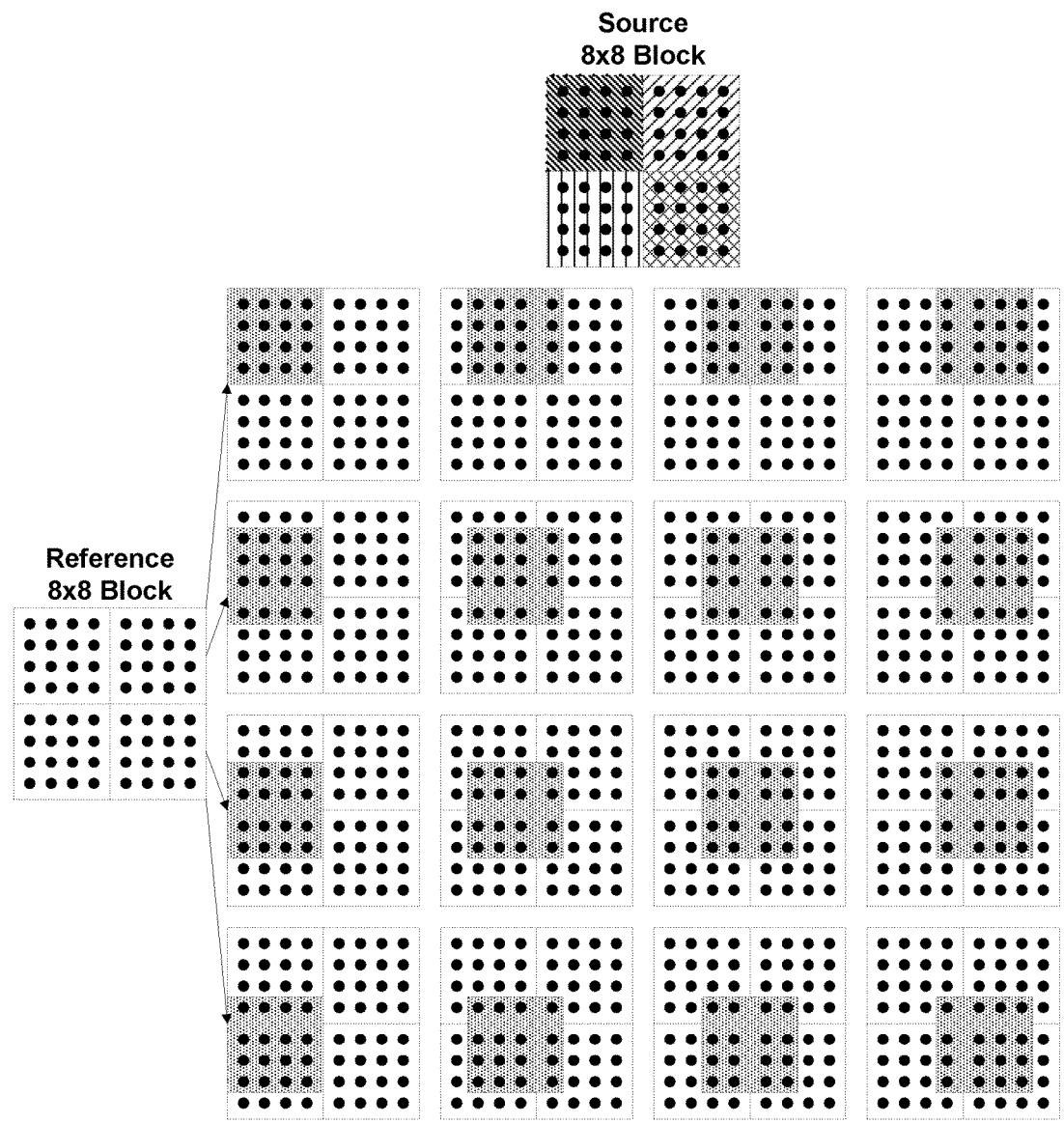
FIG. 15 shows a diagram of motion estimation for video encoding in a video processing system.

FIG. 15 shows a diagram of video encoding in a video processing system. A completely programmable multi-threaded video processing engine is implemented to carry out decode/encode/transcode and other video post-processing operations. Video processing involves parsing of bit-streams and computations on blocks of pixels. The presence of multiple blocks in a frame enables efficient multi-threaded processing. All the block computations are carried out in SIMD fashion. The key to realizing maximum benefit from SIMD processing is designing the right width for the SIMD engine and also providing the infrastructure to feed the engine the data that it needs. This data includes the instruction along with the operands which could be on-chip registers or data from buffers in memory.

Video Decoding—Involves high-level parsing for stream properties & stream marker identification followed by variable-length parsing of the bit-stream data between markers. This is implemented in the programmable processor with specialized instructions for fast parsing. For the subsequent mathematical operations (Inverse Quantization, IDCT, Motion Compensation, De-blocking, De-ringing), a byte engine to accelerate operations on byte & word operands has been defined.

Video Encoding—Motion Estimation is carried out to determine the best match using a high-density SAD4×4 instruction (each of the four 4×4 blocks in the source are compared against the sixteen different 4×4 blocks in the reference). This is followed by DCT, quantization and video decoding which is carried out in the byte engine. The subsequent variable-length-coding is carried out with special bit-stream encoding and packing instructions.

Video Transcoding—Uses a combination of the techniques defined for decoding and encoding.

Video Post-Processing

Figure 16:
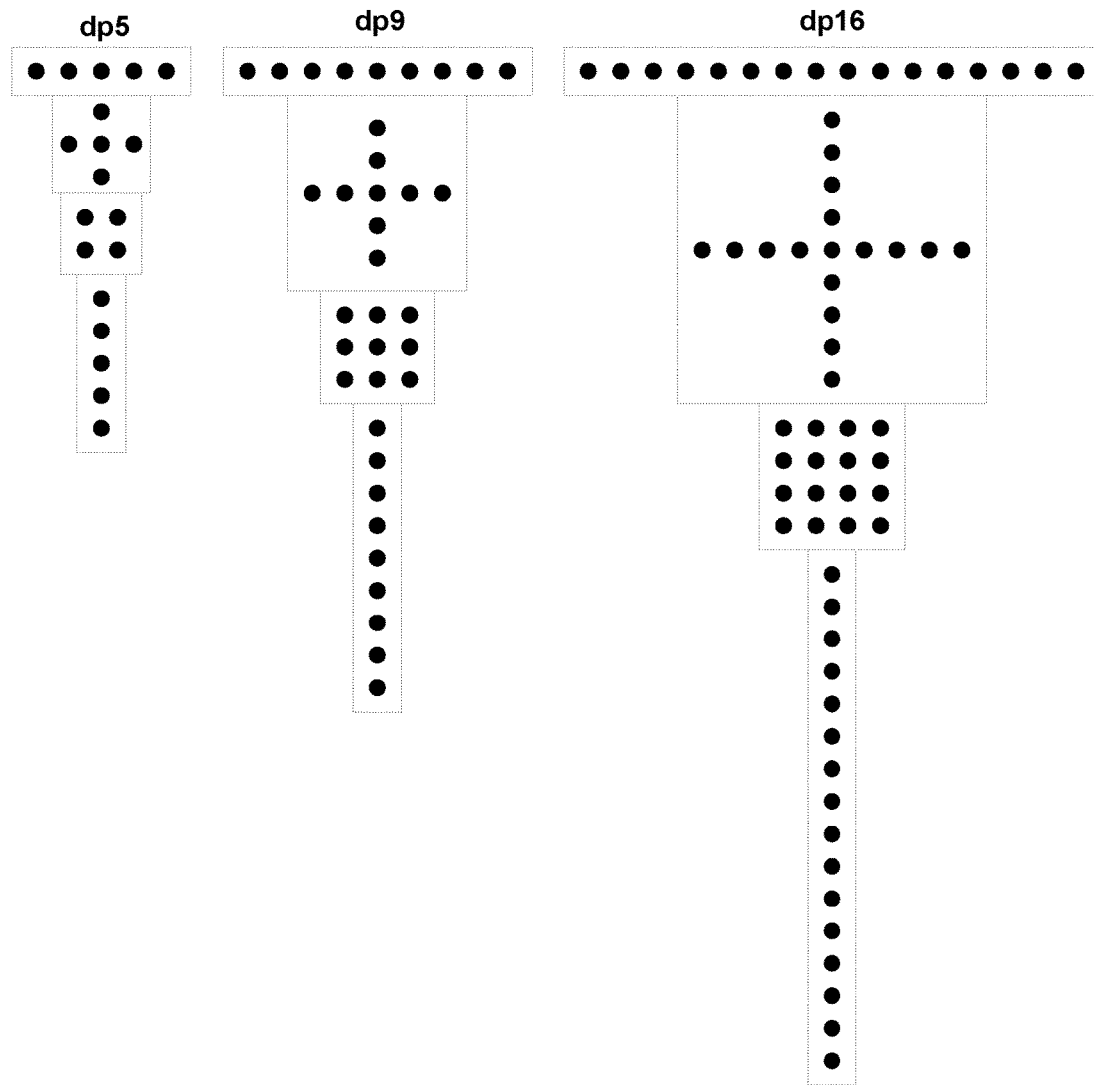
FIG. 16 shows a diagram of tap filtering for video post-processing in a video processing system.

FIG. 16 shows a diagram of video post-processing in a video processing system. A number of post-processing algorithms involve filtering of pixels in horizontal and vertical direction. The fetching of pixel data from memory and its organization in the on-chip registers enables efficient access to data in both directions. The filtering is carried out with dot-product instructions (dp5, dp9 & dp16) in multiple shapes (horizontal, bidirectional, square, vertical).

Branch Technique

Figure 17:
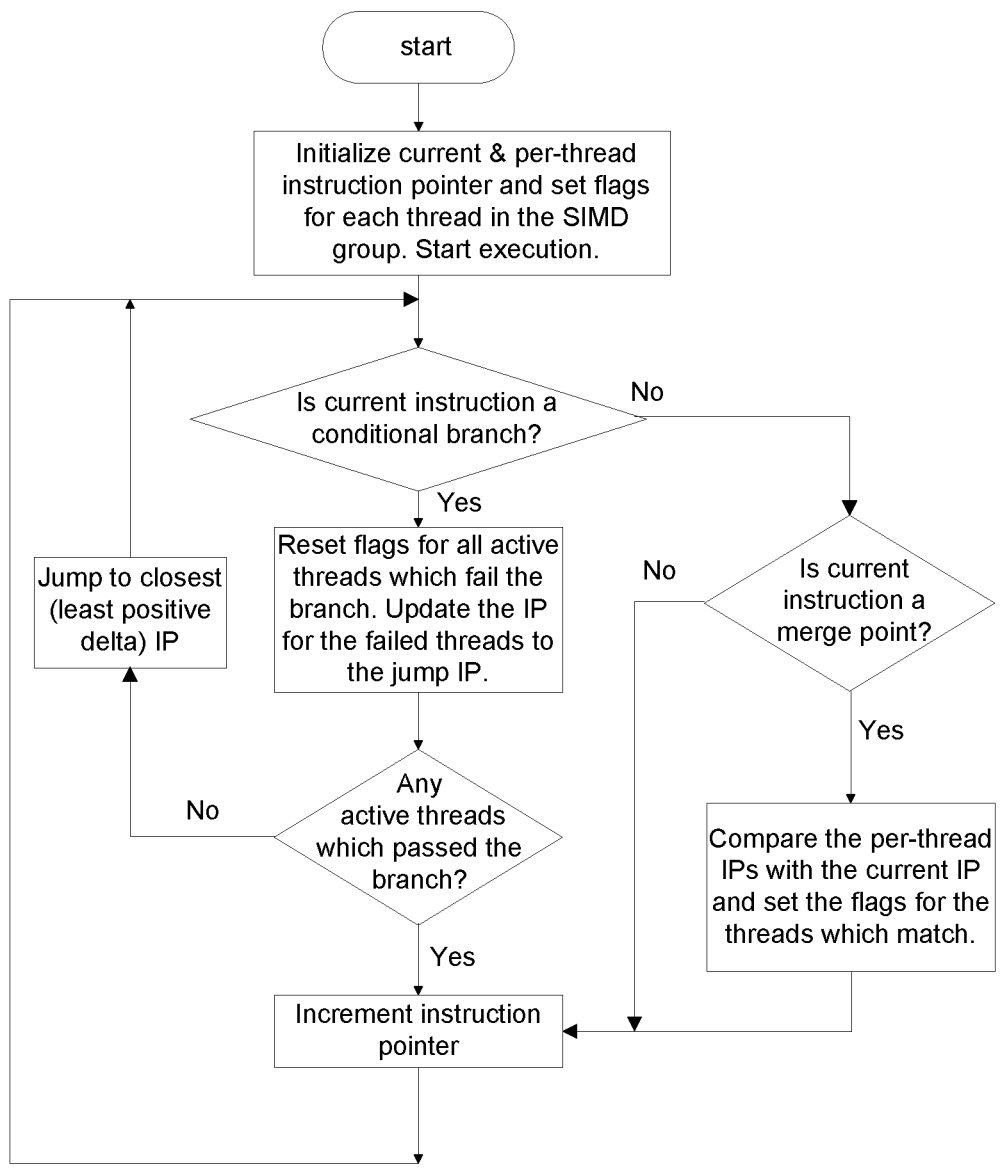
FIG. 17 shows a flowchart of a Single Instruction Multiple Data (SIMD) branch technique.

FIG. 17 shows a flowchart of branch technique. When processing programs in SIMD (multiple threads in one group) fashion, scenarios emerge where the different threads within the group take different paths in the program. A simple and cheap scheme to handle branches, both conditional and unconditional in a SIMD engine, is described here.

An execution instruction pointer (IP) is maintained along with a flag bit for each thread in the group. The flag indicates that the thread is in the same flow as the current execution and hence, execution only occurs for threads that have their flag set. The flag is set for all threads at the beginning of execution. Because of a conditional branch, if a thread does not take the current execution code path, its flag is turned off and its execution IP is set to the pointer it needs to move to. At merge points, the execution IP of threads whose flags are turned off are compared with the current execution IP. If the IPs match, the flag is set. At branch points, if all currently active threads take the branch, the current execution IP is set to the closest (minimum positive delta from the current execution IP) execution IP among all threads.

Programmable Output Merger

Figure 18:
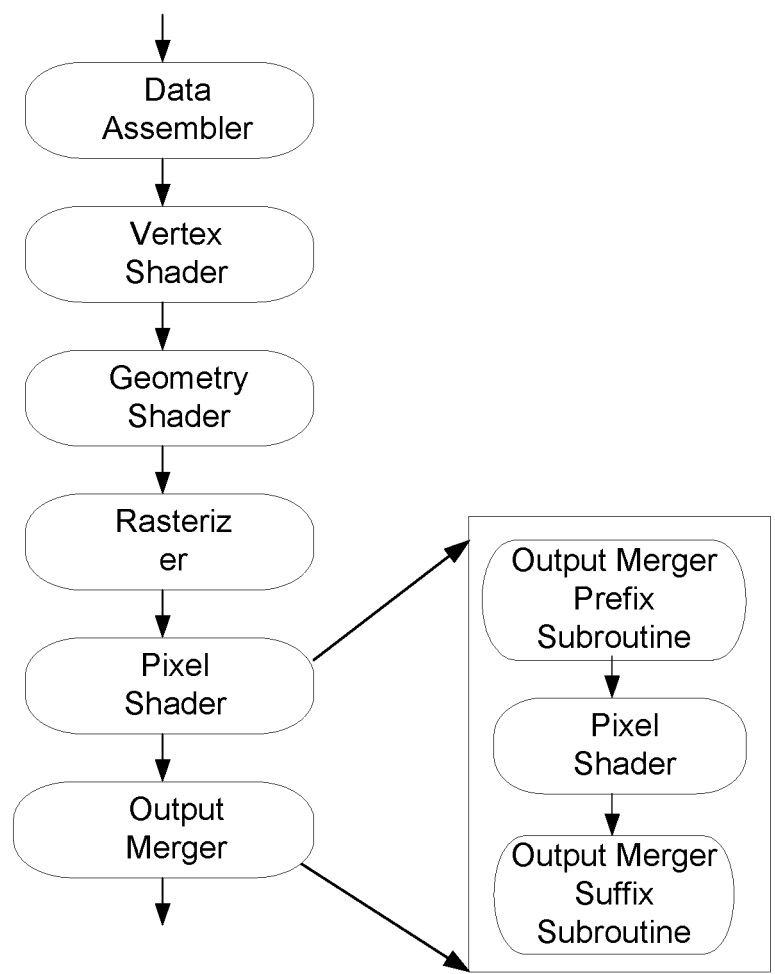
FIG. 18 shows a flowchart of programmable output merger implementation in a graphics system.

FIG. 18 shows a flowchart of programmable output merger. The 3D graphics APIs (openGL, DirectX) define a processing pipeline as shown in the diagram. Most of the pipeline stages are defined as shaders which are programs run on the appropriate entities (vertices/polygons/pixels). Each shader stage receives inputs from the previous stage (or from memory), uses various other input resources (programs, constants, textures) to process the inputs and delivers outputs to the next stage. During processing, a set of general purpose registers are used for temporary storage of variables. The other stages are fixed-function blocks controlled by state.

The APIs categorize all of the state defining the entire pipeline into multiple groups. Maintaining orthogonality of these state groups in hardware i.e. keeping the state groups independent of each other eliminates dependencies in the driver compiler and enables a state-less driver.

The final stages of the 3D pipeline operate on pixels. After the pixels are shaded, the output merger state defines how the pixel values are blended/combined with the co-located frame buffer values.

In our programmable output merger, this state is implemented as a pair of subroutines run before and after the pixel shader execution. A prefix subroutine issues a fetch of the frame buffer values. A suffix subroutine has the blend instructions. The pixel-shader outputs (which are created into the general purpose registers) need to be combined with the frame buffer values (fetched by the prefix subroutine) using the blend instructions in the suffix subroutine. To maintain orthogonality with the pixel-shader state, the pixel-shader output registers are tagged as such and a CAM (Content Addressable Memory) is used to access these registers in the suffix subroutine.

Register Remapping

This is a compiler technique to optimize/minimize the registers used in a program. To carry out remapping of the registers used in the shader programs, a bottoms-up approach is used.

The program is pre-compiled top-to-bottom with instructions of fixed size.

This pre-compiled program is then parsed bottom-to-top. A register map is maintained for the general purpose registers (GPR) which tracks the mapping between the original register number and the remapped register number. Since the registers in shader programs are 4-channel, the channel enable bits are also tracked in the register map.

All instructions not contributing to an output register are removed.

When a register is used as a source in an instruction and is not found in the register map, the register is remapped to an unused register and it is placed in the register map.

If a register used as a source/destination in an instruction is found in the register map, it is renamed accordingly.

A GPR is removed from the register map if it is a destination register (after it has been renamed) and all the enabled channels in the register map are written to (as per the destination register mask).

Once the bottom-to-top compile is complete, the program can be recompiled top-to-bottom one more time to use variable length instructions. Also, some registers with only a sub-set of channels enabled can be merged into one single register.

Although specific embodiments have been described and illustrated, the described embodiments are not to be limited to the specific forms or arrangements of parts so described and illustrated. The embodiments are limited only by the appended claims.

What is claimed:

1. A method of selecting data of a server system for transmission, comprising:
    reading data from memory of the server system;
    checking if the data is being read for the first time;
    checking if the data was written by a processor of the server system during processing, comprising checking if the data is available on a client system or present in a transmit buffer;
    placing the data in the transmit buffer if the data is being read for the first time as determined by the checking if the data is being read for the first time, and was not written by the processor of the server system during the processing as determined by the checking if the data was written by the processor of the server system during the processing, wherein if the data is being read for the first time and was written by the processor of the server system during processing the data is not placed in the transmit buffer; and
    transmitting the data of the transmit buffer to the client system.

2. The method of claim 1, wherein the processor includes at least one of a central processing unit (CPU) and a graphics processing unit (GPU), the method further comprising the GPU controlling compression and placement of data of a frame buffer into a compressed frame buffer, and the GPU controlling a selection of either compressed graphics data of the compressed frame buffer or data of the transmit buffer for transmission to the client system.

3. The method of claim 1, wherein determining whether the data is being read for the first time comprises checking at least a first status-bit.

4. The method of claim 1, wherein determining whether the data was not written by the processor comprises checking at least a second status-bit.

5. The method of claim 3, wherein the at least first status-bit is set when data is placed in the transmit buffer.

6. The method of claim 4, wherein the at least second status-bit is set when the processor writes to the memory.

7. The method of claim 5, wherein the at least first status-bit is reset upon detecting at least one of a direct memory access (DMA) of the memory or reallocation of the memory.

8. The method of claim 6, wherein the second status-bit is reset upon detecting at least one of a direct memory access (DMA) of the memory or reallocation of the memory.

9. The method of claim 1, wherein the data comprises a plurality of blocks, and wherein determining if the data is being read for the first time comprises checking at least one status-bit corresponding to at least one block.

10. The method of claim 1, further comprising compressing data of a frame buffer of the memory.

11. The method of claim 10, further comprising checking at least one of a bandwidth of a link between the server system and the client system, and capabilities of the client system, and the server system transmitting at least one of the compressed frame buffer data or the data of the transmit buffer based at least in part on the at least one of the bandwidth of the links and the capabilities of the client system.

12. The method of claim 11, wherein checking the bandwidth and the capabilities is performed on a frame-by-frame basis.

13. The method of claim 11, further comprising determining whether to compress data of the frame buffer on a frame-by-frame basis, and placing at least a percentage of the data in the transmit buffer for every frame.

14. A system for selecting data for transmission, comprising:
    a server system comprising a processor and memory, wherein the memory comprises a frame buffer and a transmit buffer, the server system operable to:
    read data from the memory;
    check if the data is being read for the first time;
    check if the data was written by the processor of the server system during processing, comprising checking if the data is available on a client system or present in the transmit buffer;
    place the data in the transmit buffer if the data is being read for the first time as determined by the checking if the data is being read for the first time, and was not written by the processor of the server system during the processing as determined by the checking if the data was written by a processor of the server system during the processing, wherein if the data is being read for the first time and was written by the processor of the server system during the processing the data is not placed in the transmit buffer.

15. The system of claim 14, wherein the processor comprises at least a central processing unit (CPU) and a graphics processing unit (GPU), and wherein the GPU controls compression and placement of data of the frame buffer into a compressed frame buffer, and the GPU controls a selection of either compressed graphics data of the compressed frame buffer or data of the transmit buffer for transmission to the client system.

16. The system of claim 14, wherein the server system is operable to compress data of the frame buffer.

17. The system of claim 16, further comprising the server system operable to select between transmitting the data of the transmit buffer or the compressed data of the frame buffer depending on a data bandwidth of a link between the server system and a client system.

18. The system of claim 17, further comprising the server system operable to select between transmitting the data of the transmit buffer or the compressed data of the frame buffer depending on capabilities of a client system, wherein the server system is linked to a client system.

19. The system of claim 15, further comprising a client system that is linked to the server system, the client system comprising at least a processor, and a client memory, and wherein the GPU determines to decompress the data or render the data to place the data in a frame buffer of the client memory based on the information in a data header of the data.

20. The system of claim 14, wherein an allocated size of the transmit buffer is adaptively determined based on at least a bandwidth of a link between the server system and the client system.

* * * * *